United States Patent [19]
Rollet et al.

[11] Patent Number: 5,738,310
[45] Date of Patent: Apr. 14, 1998

[54] RUDDER BAR SYSTEM WITH FORCE GRADIENT FOR A HELICOPTER

[75] Inventors: Philippe Alain Jean Rollet, Velaux; Jacques Serge Louis Bellera, Traverse Notre-Dame, both of France

[73] Assignee: Eurocopter France, France

[21] Appl. No.: 577,131

[22] Filed: Dec. 22, 1995

[30] Foreign Application Priority Data

Dec. 22, 1994 [FR] France .................. 94 15465

[51] Int. Cl.[6] .................. B64C 13/06; B64C 13/08
[52] U.S. Cl. .................. 244/195; 244/196; 244/223; 244/235; 318/586; 318/628
[58] Field of Search .................. 244/76 R, 175, 244/181, 194, 195, 196, 221, 223, 234, 235; 318/586, 628

[56] References Cited

U.S. PATENT DOCUMENTS

| 2,695,145 | 11/1954 | Lear et al. ............... 318/628 X |
| 2,936,976 | 5/1960 | Greenland et al. .......... 244/223 |
| 4,607,201 | 8/1986 | Koenig .................. 244/181 X |
| 4,607,202 | 8/1986 | Koenig .................. 318/628 |
| 4,664,346 | 5/1987 | Koenig .................. 318/628 X |
| 5,489,830 | 2/1996 | Fernandez ............... 318/628 |

FOREIGN PATENT DOCUMENTS

| 0160834A3 | 11/1985 | European Pat. Off. |
| 2068598 | 8/1981 | United Kingdom. |
| 2140174 | 11/1984 | United Kingdom. |

Primary Examiner—William Grant
Attorney, Agent, or Firm—Watson Cole Stevens Davis, P.L.L.C.

[57] ABSTRACT

A rudder bar system for a helicopter controlled in yaw by acting on the tail rotor or an equivalent device has a capability, as a function of the parameters representative of the current flight status of the helicopter, of either automatically continuously recentering the forces on the rudder bar, which cancels out the residual static forces and gives the pilot a tactile sensation close to that given by a friction-type rudder bar, or allowing the pilot fully to feel the countering action of an elastic return device such as a spring.

11 Claims, 2 Drawing Sheets

# RUDDER BAR SYSTEM WITH FORCE GRADIENT FOR A HELICOPTER

FIELD OF THE INVENTION

The present invention relates to a rudder bar system for a helicopter and, more generally, any device making it possible to control an aircraft on the yaw axis.

DESCRIPTION OF RELATE ART

It is known that many helicopters include a tail rotor with or without a fairing, tasked with counteracting the reaction torque generated by the main rotor on the fuselage of said helicopters, and that such a tail rotor, having variable pitch, is additionally used by the flight control system of these helicopters in order to pilot them in yaw. To this end, the pitch of the blades of said tail rotor is controlled by the pilot, by acting on the rudder bar of the helicopter. It is known moreover that other devices exist for yaw control of helicopters, such as, for example, that manufactured by the American constructor Mc DONNELL DOUGLAS, under the name of NOTAR.

Thus, if the flight control system is of the usual type with a rear rotor, the position of the rudder bar when the helicopter is in yaw equilibrium (that is to say when the yaw angular speed is zero) reproduces the amplitude of the pitch applied to the blades of the rear rotor. However, it is known that, on such a helicopter, the pitch applied to the blades of the tail rotor depends heavily on the flight configuration, and in particular on the air, longitudinal, lateral and vertical speeds.

Hence it results therefrom, for the pilot, that, even in the absence of any yaw maneuver, the static position of the rudder bar is essentially variable according to the flight conditions.

In order to minimize this drawback, devices have already been used contributing to limiting the displacements of the rudder bar when, outside of any yaw maneuver, the flight conditions change. For example, on the majority of medium- and heavyweight helicopters, devices are provided for coupling between the collective pitch of the blades of the main rotor and the pitch of the blades of the rear rotor. Such devices for coupling the collective pitch and the yaw-control pitch contribute to minimizing the rudder bar displacements which are necessary for maintaining yaw equilibrium, when the pilot causes the vertical speed to alter by acting on the collective pitch. However, whatever the degree of sophistication of such devices, it is impossible totally to cancel out the displacements of the rudder bar given that, by the very principle of control, the position of the rudder bar should, at equilibrium, inform the pilot of the amplitude of the pitch applied to the blades of the rear rotor and of the margin of control remaining available for yaw maneuvers.

This change in the position of the rudder bar as a function of the flight configuration leads to a friction-type rudder bar, without return force, being installed on the majority of helicopters. Such a friction-type rudder bar is very simple to produce and avoids the pilot having to maintain static force by foot, when the yaw equilibrium conditions of the helicopter are altered. After having been displaced to change equilibrium condition, the rudder bar, by virtue of friction, keeps its new position if no force is exerted.

Set against its simplicity, a friction-type rudder bar carries two main drawbacks:

when the helicopter is equipped with an automatic pilot device acting on the piloting in yaw, detection of the state of piloting or of the state of absence of piloting by the pilot himself, and the motor drive to the rudder bar are relatively complex. Such detection generally requires the use of switch links, which are difficult to set up, while the device for motor drive of the rudder bar has to include a trip mechanism so that the pilot feels only the friction during actions with the foot;

when the pilot moves the rudder bar away from its equilibrium position in order to carry out a maneuver, for example a rotation in yaw in hovering flight, the absence of progressive countering force removes from him any tactile sensation of the amplitude of the demand applied. Whether it is small or large, the force to be exerted by the pilot remains the same (equal to the friction) and cancels out as soon as the desired response is achieved (no static force). This results in the pilot having no means, except by visually looking at the position of his feet, which is hardly practical, of memorizing the initial position of the rudder bar so as rapidly to regain the equilibrium position at the end of maneuver. Upon sudden cessations of rotation in yaw, this is often conveyed by some oscillations in azimuth resulting from the trial-and-error necessary to regain the equilibrium position. Hence, the absence of a force gradient makes it difficult to gauge actions with the pilot's foot during yaw maneuvers, which is all the more so the sharper the maneuver.

Moreover on a few helicopters, rudder bars called force-gradient rudder bars have already been mounted, that is to say rudder bars subject to the action of elastic means of return to the initial position before the maneuver. Such force-gradient rudder bars make it possible to avoid the two abovementioned drawbacks:

detection of the state of human piloting or of the state of automatic piloting can be carried out on the basis of a measurement of the offset with respect to the neutral point of the forces (possibility of dispensing with the switch link) and the motor drive may consist simply in displacing this neutral point;

the force gradient gives the pilot information feedback (tactile sensation) on the amplitude of the demanded displacement. Cessations of rotation at a precise heading are much neater, without a tendency to overshoot. It is sufficient for the pilot to relax the effort with the foot for the rotation to stop (with the friction-type rudder bar, it is necessary to exert an inverse force for a time which cannot be predicted in advance).

However, despite these beneficial characteristics, force-gradient rudder bars are used only in a few helicopters, since they require a device for disengagement and recentering of the forces (generally called "trim release" in aeronautics) which often has to be activated by the pilot in order to avoid static forces appearing whenever the conditions of flight change, which substantially increases the pilot's workload.

SUMMARY OF THE INVENTION

The object of the present invention is to remedy these drawbacks, and to allow an improved rudder bar system to be produced, making it possible to benefit from the advantages of the known friction-type and force-gradient rudder bars, while avoiding the drawbacks.

To this end, according to the invention, the rudder bar system for a helicopter including a control device on the yaw axis, such as, for example, a tail rotor or a NOTAR and means continuously delivering parameters representative of the current flight status of said helicopter, said system including a rudder bar which can be actuated by a pilot for piloting said helicopter in yaw by means of said control device on the yaw axis, and elastic means for return of said rudder bar being provided to exert an action counter to that exerted by said pilot on said rudder bar, is noteworthy in that it includes:

a motor capable of displacing a movable member to which said elastic return means are attached at an attachment point;

means for delivering the difference between a first electrical signal representative of the positions of said rudder bar and a second electrical signal representative of the positions of said attachment point;

a link for addressing said difference to said motor; and a first controllable switch interposed in said link and controlled from said means delivering said parameters representative of the flight status, in such a way that:

in its closed position, said first switch provides continuity of said link, when said parameters are less than reference thresholds, so that then said motor is supplied with said difference between said first and second electrical signals and so that the displacement of said movable member by said motor tends to cancel out said countering action of said elastic return means;

in its open position, said first switch cuts said link, when said parameters are greater than said reference thresholds, so that then said motor is not supplied and so that the countering action of said elastic return means is exerted fully on said rudder bar.

Hence, in the closed position of said first switch, said rudder bar system benefits from automatic recentering of the forces continuously, which cancels out the residual static forces and gives the pilot a tactile sensation similar to that obtained with a friction-type rudder bar. In contrast, in open position of said first switch, the pilot fully feels the countering-action of said elastic return means, which allows him better to gauge his action on the rudder bar.

Thus the pilot feels control forces which are variable according to the flight configuration and the degree of aggressiveness of the maneuvers.

Said difference representative of the offset between the position of the rudder bar and the attachment or anchor position can be obtained in several different ways. For example, it could be calculated in the automatic pilot or in the fly-by-wire system (if they exist). In this case, said means for delivering said difference would be only means for sending said difference between the site of its calculation and said rudder bar system. In a variant, said difference can be derived directly in said rudder bar system. To this end, said rudder bar system may additionally include:

at least one first position sensor, associated with said rudder bar and generating said first electrical signal representative of the positions of said rudder bar;

at least one second position sensor, associated with said attachment point and generating said second electrical signal representative of the positions of said attachment point; and a subtractor for forming the difference between said first and second electrical signals;

while said link links the output of said subtractor and said motor.

Obviously, such a subtractor may be formed not by a specific discrete device, but consist of a part of a more complex calculation system.

For preference, in said link, adjustment means are additionally available, such as variable-gain amplifiers or limiters, making it possible, in the closed position of said first switch, to adjust the tactile sensation of the friction type felt by the pilot actuating said rudder bar.

In a particularly simple embodiment of the rudder bar system in accordance with the present invention, use is made, as parameters representative of the state of said helicopter, the speed with respect to the air (or air speed), the yaw angular speed and the lateral acceleration (or lateral load factor). In this case, said system includes:

first, second and third comparison means for continuously comparing the air speed, the yaw angular speed and the lateral acceleration with respective reference thresholds Vo, ro, Nyo; and means for control of said first controlled switch, such that:

said first controlled switch is in the closed position if, with the air speed being below the reference threshold Vo, the yaw angular speed is below the threshold ro, or equally if, with the air speed being above the reference threshold Vo, the lateral acceleration is below the reference threshold Nyo; and said first controlled switch is in the open position if, with the air speed being below the reference threshold Vo, the yaw angular speed is above the threshold ro, or equally if, with the air speed being above the reference threshold Vo, the lateral acceleration is above the reference threshold Nyo.

Hence the forces on the rudder bar can be recentered in an automatic way onto the current position of the rudder bar, both at low speed and in cruise, whenever the helicopter is not performing an abrupt maneuver. In the event of an abrupt maneuver, recentering of the forces is frozen and the pilot feels the countering action of the elastic return means.

In one particularly simple embodiment, said means for control of said first controlled switch take the form of a first two-channel router, which is controlled by said first means for comparison of the air speed with the corresponding reference threshold and which controls said first controlled switch by one or other of the signals output by said second and third comparison means.

However, it is known that the restoration of the control margins on helicopters is a very important problem, particularly when systems automatically process pilots' control displacements.

In the case of a friction-type rudder bar, the control end stop is felt when the pedal encounters the physical end-of-travel stop of the equipment. The approach of the end stop is perceived only by the change in the position of the foot, and thus imprecisely. In contrast, with a force-gradient rudder bar, the sensation of increasing force felt at the feet usefully supplements the notion of absolute position of the rudder bar.

Advantageously, according to one feature of the present invention, so as to be able to benefit from an approach to the end stops similar to that of the force-gradient rudder bars, even when the rudder bar in accordance with the invention is operating in automatic recentering mode, the automatic motor drive of the rudder bar is frozen on approach to the physical end-of-travel stops of the rudder bar. This has the consequence of defining a range of travel close to the end stops, where piloting control is always against a force (the manual release can, however, be activated).

To this end, the rudder bar system in accordance with the present invention additionally includes:

fourth comparison means making it possible continuously to compare said second electrical signal representative of the displacements of said attachment point with at least one reference threshold po representative of at least one nearby position of an end stop of the rudder bar; and a second controllable switch interposed on said link, and driven open by said fourth comparison means in the case in which the value of said second electrical signal reaches said reference threshold po.

Thus, the appearance of the force in piloting combined with the position of the foot warns the pilot of the approach of the end stop before it is reached.

When the position of the attachment point enters a region close to end stops which is delimited by said threshold or thresholds, for example at 10% from the end stop, the automatic recentering function is frozen by cancellation of the set point value sent to the motor. The function of automatic control of the recentering therefore intervenes only over a reduced range of the total travel of the rudder bar.

From what has just been described, it will be easily understood that the rudder bar system in accordance with the invention can be combined with a mechanical control linkage in order to control the helicopter in yaw. However, it is very particularly appropriate for being used in association with a fly-by-wire system. In this latter case, at least a part of said rudder bar system (with the exception of the rudder bar itself) can be integrated into said fly-by-wire system.

In the case in which said fly-by-wire system includes an automatic pilot device intended to provide automatic holds of said helicopter in yaw, such as automatic heading hold or automatic ball hold (coordinated turns), it is advantageous additionally to provide:

a detector of the human piloting status or of the automatic piloting status of said helicopter in yaw; and a second two-channel router interposed on said link between said subtractor and said motor, downstream of said first switch, and controlled by said detector, either to provide the continuity of said link, or to link said automatic pilot device to said motor.

Thus, the rudder bar system in accordance with the present invention is completely compatible with automatic piloting modes of the heading hold type (by action around the yaw axis) or ball hold type, which require motor drive of the rudder bar for recentering the control members when the pilot is not active.

Hence the rudder bar system is capable of allowing the two following operating modes:

the piloted mode, in which the pilot acts on the rudder bar, the automatic hold functions then being inhibited and the function of automatic recentering of the forces on the rudder bar being active;

the automatic mode, in which the pilot does not act on the rudder bar, the automatic hold functions being active and driving the rudder bar so as to recenter the control members (fly-by-wire or series jack of the automatic pilot), while the function of automatic recentering of the forces on the rudder bar is inactive.

The said detector, intended to detect the current state of piloting (human or automatic), can be of different types. For example, it could consist of a force sensor directly measuring the force exerted by the foot on the rudder bar. However, in one advantageous embodiment, provision is made for detection of the current piloting state to be based on the measurement of the offset of the rudder bar with respect to the current anchoring position of said rudder bar elastic return means.

In this case, said detector may be formed by fifth comparison means making it possible continuously to compare said difference between said first and second electrical signals with a reference threshold do, said fifth comparison means controlling said second router so that the latter provides, on the one hand, continuity of said link when said difference is above said reference threshold do and, on the other hand, connection of said automatic pilot device to said motor when said difference is below said reference threshold do.

BRIEF DESCRIPTION OF THE DRAWINGS

The figures of the attached drawings will give a good understanding of how the invention can be produced in these figures, identical references designate similar elements.

DETAILED DESCRIPTION OF THE PREFERRED EMBODIMENT

Figure 1:
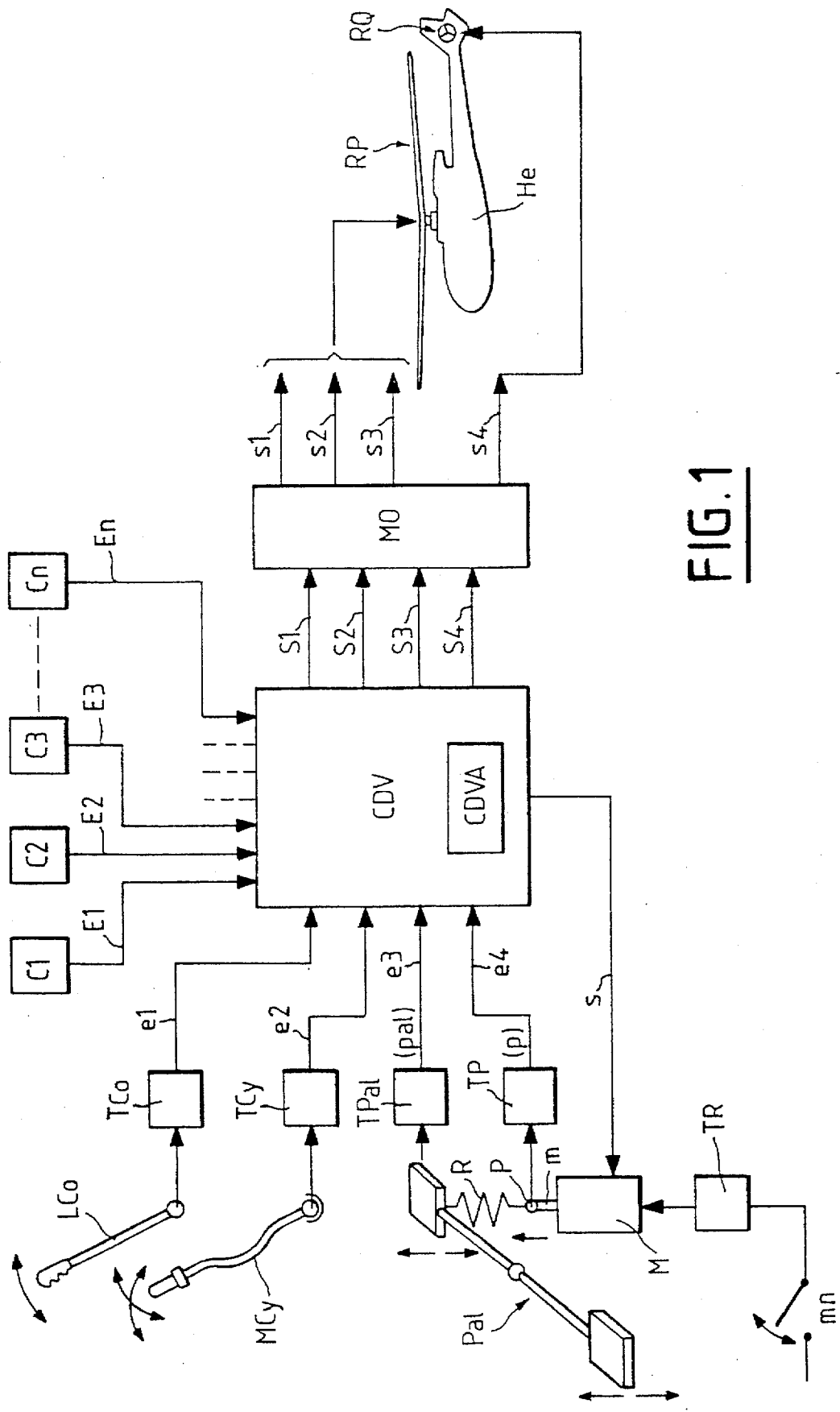
FIG. 1 shows the block diagram of an embodiment example for a flight control system for a helicopter, incorporating the rudder bar system in accordance with the present invention.
Figure 2:
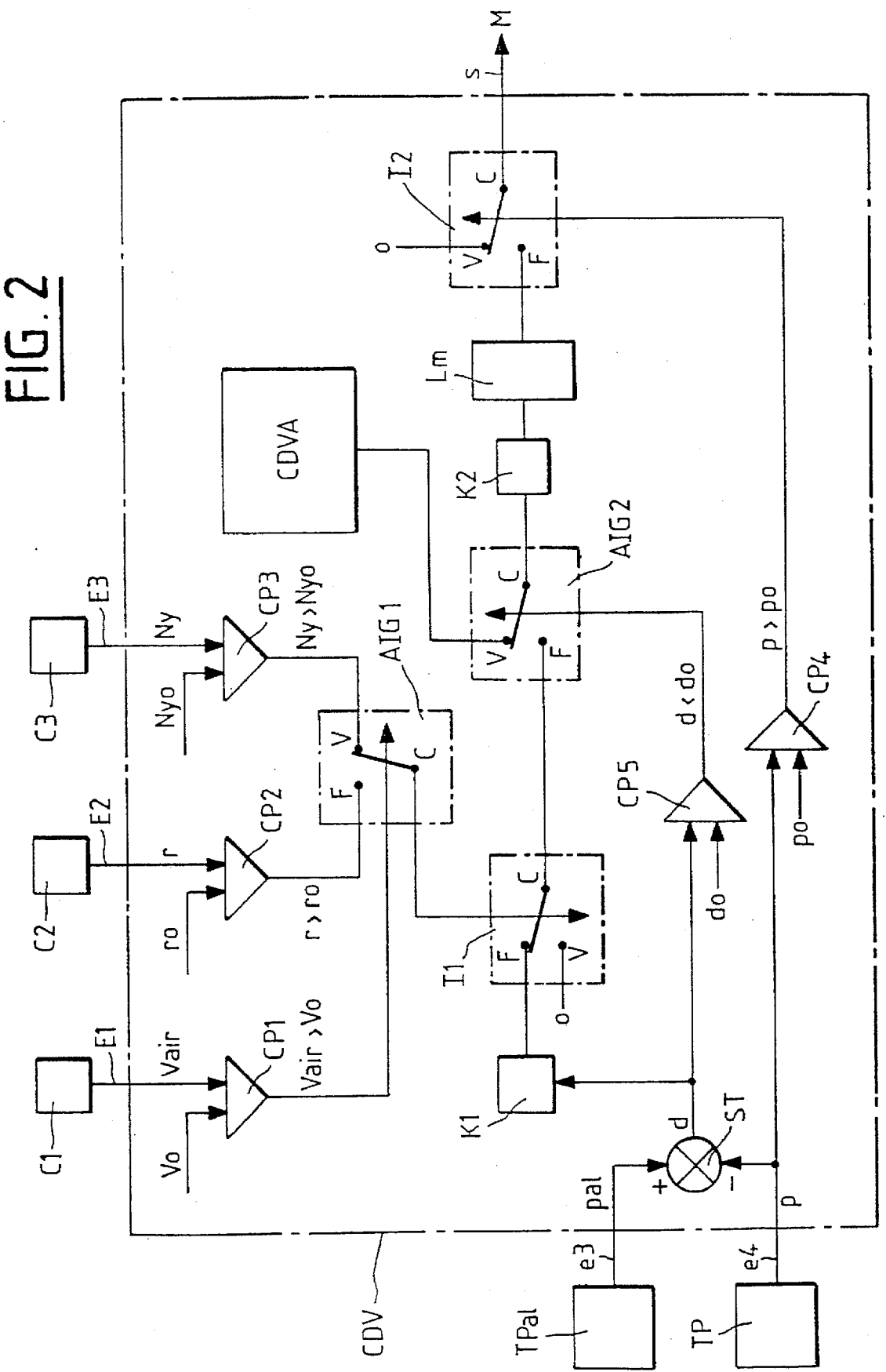
FIG. 2 is the block diagram of an embodiment example of the rudder bar system in accordance with the present invention.

The systems represented diagrammatically by FIGS. 1 and 2 are, obviously, mounted on board a helicopter He to be piloted, although, for reasons of clarity of the drawing, the helicopter He is represented on a small scale, externally to said system, in FIG. 1. The helicopter He includes at least one main rotor RP intended to provide lift and forward motion, as well as a control device on the yaw axis, represented in the form of a tail rotor RQ, intended to provide the equilibrium and yaw control of the helicopter He.

The example embodiment of a flight control system for a helicopter, shown diagrammatically in FIG. 1, includes a fly-by-wire control device receiving a plurality of information and sending out control demands. To this end, in the example represented, the following are associated with the device CDV:

the collective pitch lever LCo, associated with a transducer TCo converting the displacements of said lever into an electrical signal addressed to the device CDV via a link e1;

the cyclic pitch stick MCy, associated with a transducer TCy converting the displacements of said stick into an electrical signal, addressed to the device CDV via a link e2;

the rudder bar Pal, associated with a position sensor TPal converting the displacements of said rudder bar into an electrical signal pal, addressed to the device CDV via a link e3;

a device for motor drive of the rudder bar Pal, including at least one electric motor M (for example of the electric jack type) acting on a movable member m linked to said rudder bar Pal by a return spring R, opposing the action of the pilot on said rudder bar;

a position sensor TP, converting the displacements of the point P, to which the return spring R is attached on the movable member m into an electrical signal p, addressed to the device CDV via a link e4;

a plurality of n sensors C1 to Cn, mounted on board the helicopter and delivering a plurality of information, in the form of electrical signals, on the states of said helicopter, such as air speed, angular speeds, angular accelerations, attitudes, load factors, etc., the said information being addressed to the device CDV via links E1 to En;

a demands mixer MO receiving, via the links S1 to S4, the control demands derived by the device CDV from the signals addressed by the links e1 to e4 and E1 to En, and addressing control demands, via the links s1 to s3, to the servo controls of the main rotor RP and, via the link s4, to the servo control of the tail rotor RQ;

a link s by which the device CDV addresses, to the motor M of the rudder bar Pal, demands for displacements of the movable member m and thus of the attachment point P; and a device TR for releasing and manual recentering of the forces on the rudder bar Pal, controlled by handle mn available to the pilot.

In FIG. 2, a simple example embodiment of the rudder bar system in accordance with the present invention has been represented, consisting partly of the fly-by-wire device CDV. In FIG. 2, only the links serving for the motor drive of the rudder bar Pal have been represented. This embodiment example, in accordance with the present invention, involves:

the rudder bar position sensor TPal, generating the electrical signal pal on the link e3, said signal pal being representative of the displacements of the rudder bar Pal;

the position sensor TP, generating the electrical signal p on the link e4, said signal p being representative of the displacements of the attachment point P;

the sensor C1, generating, on the link E1, an electrical signal Vair representative of the speed of the helicopter with respect to the air;

the sensor C2, generating, on the link E2, an electrical signal r representative of the yaw angular speed of the helicopter; and the sensor C3, generating, on the link E3, an electrical signal Ny representative of the lateral load factor of said helicopter.

Moreover, the part involved with said fly-by-wire device CDV includes:

a subtractor ST, linked to the links e3 and e4 and delivering at its output the signal d, representative of the difference pal-p;

a first comparator CP1, receiving the signal Vair generated by the sensor C1 and comparing it with a reference value Vo;

a second comparator CP2, receiving the signal r generated by the sensor C2 and comparing it with a reference value ro;

a third comparator CP3, receiving the signal Ny generated by the sensor C3 and comparing it with a reference value Nyo;

a fourth comparator CP4, receiving the signal p generated by the position sensor TP and comparing it with a reference value po;

a fifth comparator CP5, receiving the signal d generated by the subtractor ST and comparing it with a reference value do;

an automatic pilot device CDVA performing the automatic hold functions of the helicopter He in yaw, such as automatic heading hold or automatic ball hold;

a first two-channel router AIG1 controlled by said first comparator CP1, and the rest input F and the working input V of which are linked respectively to the outputs of said second and third comparators CP2 and CP3;

a first controllable switch I1 controlled by the common output C of said first router AIG1, and the rest input F of which is linked to the output of the subtractor ST, by way, for example, of a variable-gain amplifier K1, in such a way as to receive the signal d. The working input V of the switch I1 is at the 0 potential;

a second two-channel router AIG2 controlled by said fifth comparator CP5, and the rest input F and the working input V of which are linked respectively to the common output C of said first switch I1 and to the output of the automatic pilot device CDVA; and a second controllable switch I2 controlled by said fourth comparator CP4 and the rest input F of which is linked to the common output C of said second router AIG2, by way, for example, of a variable-gain amplifier K2 and of a limiter Lm. The working input V of the switch I2 is at the 0 potential.

In the device of FIG. 2:

the first router AIG1 is driven into working position for which the output of the third comparator CP3 controls the first switch I1—when the first comparator CP1 receives a signal Vair above the reference Vo;

the first controllable switch I1 is driven into rest position—for which the signal d is sent to the second router AIG2—when said first router AIG1 is in working position and when said third comparator CP3 receives a signal Ny above the reference Nyo, or when said first router AIG1 is in rest position and when said second comparator CP2 receives a signal r above the reference Ro;

the second router AIG2 is driven by the fifth comparator CP5 into working position—for which the output of the device CDVA is linked to said second switch I2 through the amplifier K2 and the limiter Lm when the signal d is below the reference do; and the second switch I2 is driven into working position—for which the output s of the device CDV is isolated from the common output C of the second router AIG2—when the signal p is above the reference po.

The various operating modes of the device of FIG. 2 are as follows:

A/ Control of the helicopter in yaw by human piloting a) piloting at low speed (Vair≦Vo)

If the air speed Vair is below the reference Vo (Vo being equal, for example, to 45 Kts), the first router AIG1 is in rest position, so that the first switch I1 is controlled by the second comparator CP2. If, moreover, the yaw angular speed r is below the reference ro (ro being equal, for example, to 10°/s), the first switch I1 addresses, on the output s, through the second router AIG2 and the second switch I2 then both in rest position, a control signal resulting from processing of the difference signal d by the gains K1 and K2 and by the limiter Lm. This control signal drives the motor M.

Hence, for air speeds below 45 Kts, for example, at which the helicopter is most likely to perform yaw rotations, control of the motor drive for centering the forces of the rudder bar is such that the neutral point P follows the movements of the rudder bar Pal, whenever the yaw angular speed r is below the threshold ro.

Consequently, when the helicopter is moving at low speed, with an approximately constant heading (yaw angular speed below ro), the motor M, by appropriately displacing the neutral point P, continuously and automatically recenters the return force exerted by the spring R on the rudder bar Pal. Such an automatic recentering of the return force can be set so as to be more progressive than the simple release generated by acting on the device TR which generally causes an abrupt disappearance of the forces. The sensation felt by the pilot can be similar to that obtained with a friction-type rudder bar and all the static forces are dispensed with, which eliminates the need for manual recentering by action on the device TR.

If the pilot demands rapid rotations, the yaw angular speed r becomes greater than the reference ro, so that the first switch I1 passes to working position, cutting the link between the output s and the input d. The motor M is thus no longer driven and the recentering of the forces at the rudder bar is made passive. The pilot then regains the advantages of the force-gradient rudder bar for gauging and rapid stopping of the yaw rotation of the aircraft.

b) piloting in forward flight at high speed (Vair>Vo)

As soon as the air speed Vair becomes greater than the reference Vo, the first router AIG1 passes into working position so that the first switch I1 is controlled by the third comparator CP3. It results therefrom, in a way similar to what was mentioned above in connection with the yaw angular speed r, that now the automatic recentering of the forces at the rudder bar is controlled by the lateral load factor Ny, and particularly as a function of the value of the latter with respect to the reference Nyo, which can, if appropriate, be chosen to be variable as a function of the air speed Vair.

Thus, if in forward flight, the pilot actuates the rudder bar Pal so as to keep the ball centered, which corresponds to a practically zero value of Ny which is therefore below the reference Nyo, the motor M continuously and automatically recenters the return forces by the spring R, in a way similar to what was described above in connection with low-speed piloting with small values of r, and the pilot experiences sensations similar to those generated by a friction-type rudder bar.

In contrast, if the pilot performs an action with the foot on the rudder bar Pal in order to generate stabilized side slip of the helicopter, and, consequently, the load factor Ny becomes greater than the reference Nyo, the first switch I1 passes from its conducting rest position to its cut-off working position. Recentering of the forces is then made passive (in a way similar to what was described above for piloting at low speed and with high yaw angular speed) and the pilot then regains the advantages of the force-gradient rudder bar for gauging the side slip.

Obviously, if the pilot deliberately wishes to maintain the side slip without having to exert static forces on the rudder bar Pal, he can manually recenter said forces by means of the device TR.

B/ Coupling with the heading hold and ball hold functions

In order to explain bidirectional passage between the mode of piloting with the rudder bar (human piloting) and the mode of piloting in yaw in automatic hold mode (piloting by the device CDVA), it is assumed, in the explanation below, that initially the position is stabilized, with the automatic hold functions activated, that is to say that the second router AIG2 is in working position and links the device CDVA to the motor M.

If the pilot wishes to change flight configuration, for example in order to make a rapid change of heading at low speed, he exerts an abrupt force on the rudder bar, so that it generates a position offset between the rudder bar Pal and the point P of attachment of the return spring R on the movable member m. The difference d thus increases. As soon as the difference d becomes equal to or greater than the reference do, the comparator CP5 drives the second router AIG2 so that it passes into rest position and links the first switch I1 to the motor M. The automatic hold functions (exercised by the device CDVA) are therefore then inhibited.

In this example, taking the case in which the change of heading is carried out at low speed (Vair<Vo), it is therefore the angular speed r which controls the first switch I1.

The rapid change from one heading to another entails an abrupt variation in the angular speed r which remains above the threshold ro. Consequently, as was explained above, the first switch I1 passes into working position, cutting the link with the output s. The pilot thus acts against the forces applied on the rudder bar Pal by the return spring R. However, on approaching the new desired heading, the pilot, in order to restabilize the helicopter, causes the angular speed r to drop off. As soon as the latter becomes lower, by decreasing, than the reference ro the first switch I1 passes back into rest position and the motor M is supplied with the difference d, so that the return force of the spring r is automatically recentered.

If the static position of the rudder bar has changed between the two flight configurations, the attachment point P regains the new position of the rudder bar, which is conveyed, for the pilot, by the sensation of automatic reduction of the forces.

As soon as the position of the attachment point P has rejoined the current position of the rudder bar, the difference d again becomes less than the reference do, so that the comparator CP5 drives the second router AIG2 so that it passes to its working position, linking the device CDVA to the motor M.

The functions of automatic hold in yaw are therefore again active.

Moreover, it will be noted that, by virtue of the fourth comparator CP4 and of the second switch I2, the pilot is warned of the approach of an end stop of the rudder bar Pal. This is because, as soon as said second electrical signal p becomes greater than or equal to reference value po, the second switch I2 is driven to open. Consequently, the supply to the motor M is cut off and the pilot feels the increasing force which he is exerting on the rudder bar counter to the action of the return spring R. The pilot is thus warned in a tactile way of the approach of the end stop of the rudder bar, all the more so as he simultaneously perceives his control margin via the absolute position of his foot and the stretching of his leg.

It will be noted moreover, that the function of the fourth comparator CP4 can be performed in different ways, particularly having regard to the fact that said rudder bar Pal has two end stops, which would therefore require two reference values po.

In FIG. 2, it has been assumed that the fourth comparator CP4 compared the absolute value of the signal p with a reference po, that is to say that the margin of detection of the two end stops was the same.

For example, if it is assumed that the rudder bar has a range of travel, on either side of a neutral position, of respectively +50% and −50%, po can be taken to be equal to 40%, so that the second switch I2 will be open as soon as the rudder bar is brought to less than 10% from each of said end stops.

Obviously, instead of providing only one reference value po as above and comparing it with the absolute value of the signal p, it would be equally valid to define two reference values po1 and po2, each associated with one end stop of the rudder bar Pal, and to compare said signal p (and no longer its absolute value) with said reference values po1 and po2.

It will be noted moreover, in FIG. 1, that the rudder bar Pal is represented in a functional, very diagrammatic way. Obviously, this rudder bar may, as usual, consist of two pedals with a horizontal axis, which are coupled so as to move in opposition.

We claim:

1. A rudder bar system for a helicopter which has a yaw axis, the helicopter comprising a control device on the yaw axis for piloting the helicopter in yaw and sensor means for continuously delivering parameters representative of a current flight status of said helicopter, said system comprising:

a rudder bar, receiving an actuation from a pilot, for controlling said control device on the yaw axis to pilot the helicopter in said yaw;

elastic means for exerting an actuation on the rudder bar counter to the actuation exerted by said pilot on said rudder bar;

a movable member attached to the elastic means at an attachment point;

a motor for displacing the movable member;

first position sensing means for sensing a position of the rudder bar and for outputting a first electrical signal indicating the position of the rudder bar;

second position sensing means for sensing a position of the attachment point and for outputting a second electrical signal indicating the position of the attachment point;

difference calculating means for calculating a difference between the first electrical signal and the second electrical signal;

link means for supplying a signal representing said difference to said motor to control the motor to displace the movable member to cancel out the actuation exerted on the rudder bar by the elastic means;

a first controllable switch for selectively opening and closing so as to prevent said link means from supplying the signal representing the difference to the motor when the first controllable switch is open and to allow said link means to supply the signal representing the difference to the motor when the first controllable switch is closed; and switch controlling means, receiving the parameters representative of the current flight status from said sensor means, for controlling the first controllable switch to open or close in accordance with the parameters.

2. The rudder bar system as claimed in claim 1, wherein the difference calculating means comprises a subtractor for forming the difference between said first and second electrical signals to form said signal representing said difference; and wherein said link means comprises means for receiving said signal representing said difference from the subtractor and for supplying said signal representing said difference to said motor.

3. The rudder bar system as claimed in claim 1, wherein said link means comprises adjustment means for adjusting said signal representing said difference to adjust a tactile sensation felt by the pilot actuating said rudder bar.

4. The rudder bar system as claimed in claim 1, wherein:

said parameters representative of the current flight status of said helicopter comprise at least an air speed, a yaw angular speed and a lateral acceleration; and said switch controlling means comprises:

comparison means for continuously comparing the air speed, the yaw angular speed and the lateral acceleration with a reference threshold air speed, a reference threshold angular speed and a reference threshold lateral acceleration, respectively; and switch actuating means for actuating said first controllable switch
 (i) to close when, with the air speed being below the reference threshold air speed, the yaw angular speed is below the reference threshold angular speed, or when, with the air speed being above the reference threshold air speed, the lateral acceleration is below the reference threshold lateral acceleration; and
 (ii) to open when, with the air speed being below the reference threshold air speed, the yaw angular speed is above the threshold angular speed, or when, with the air speed being above the reference threshold air speed, the lateral acceleration is above the reference threshold lateral acceleration.

5. The rudder bar system as claimed in claim 4, wherein the comparison means comprises:

a first comparator for comparing the air speed with the reference threshold air speed and outputting a first comparison result;

a second comparator for comparing the yaw angular speed with the reference threshold angular speed and outputting a second comparison result; and a third comparator for comparing the lateral acceleration with the reference threshold lateral acceleration and outputting a third comparison result.

6. The rudder bar system as claimed in claim 5, wherein said switch actuating means comprises a first two-channel router for routing, in accordance with said first comparison result, one of the second comparison result and the third comparison result to said first controllable switch as a control signal for said first controllable switch.

7. The rudder bar system as claimed in claim 1, wherein:

the helicopter comprises fly-by-wire means, receiving the parameters from the sensor means, for piloting the helicopter by controlling at least the control device on the yaw axis; and said rudder bar system is at least partly integrated into said fly-by-wire means.

8. The rudder bar system as claimed in claim 7, wherein:

said fly-by-wire means comprises automatic piloting means for providing automatic hold of said helicopter in said yaw; and the rudder bar system further comprises:

a detector for detecting whether said helicopter is being piloted in said yaw by the pilot or by the automatic piloting means; and a second two-channel router, interposed between said first switch and said motor, for selectively connecting either said link means or said automatic piloting means to said motor in accordance with a detection result of said detector.

9. The rudder bar system as claimed in claim 8, wherein said detector comprises:

difference comparison means for continuously comparing said difference between said first and second electrical signals with a reference threshold difference to produce a difference comparison result; and means for controlling said second two-channel router in accordance with the difference comparison result (i) to connect said link means to said motor when said difference between said first and second electrical signals is above said reference threshold difference and (ii) to connect said automatic piloting means to said motor when said difference between said first and second electrical signals is below said reference threshold difference.

10. The rudder bar system as claimed in claim 1, further comprising:

displacement comparison means for comparing said second electrical signal with at least one reference threshold displacement signal representative of at least one position of an end stop of the rudder bar and outputting a displacement comparison result; and a second controllable switch, interposed between said first controllable switch and said motor and receiving said displacement comparison result, for opening to prevent the signal representing the difference from reaching the motor when the second electrical signal reaches said reference threshold displacement signal.

11. The rudder bar system as claimed in claim 1, wherein the switch controlling means comprises means for controlling the first controllable switch (i) to close when the parameters are less than reference thresholds and (ii) to open when the parameters are greater than the reference thresholds.

* * * * *